(12) United States Patent
Kim (10) Patent No.: US 12,470,581 B2
(45) Date of Patent: Nov. 11, 2025

(54) SERVICE PROVIDING SYSTEM AND METHOD FOR SECURITY OF DATA BASED ON WEB BROWSER

(71) Applicant: DRM INSIDE CO., LTD., Seoul (KR)

(72) Inventor: Tae Hyun Kim, Seoul (KR)

(73) Assignee: DRM INSIDE CO., LTD., Seoul (KR)

( * ) Notice: Subject to any disclaimer, the term of this patent is extended or adjusted under 35 U.S.C. 154(b) by 41 days.

(21) Appl. No.: 18/750,942

(22) Filed: Jun. 21, 2024

(65) Prior Publication Data

US 2025/0175480 A1  May 29, 2025

(30) Foreign Application Priority Data

Nov. 24, 2023 (KR) .................. 10-2023-0165730

(51) Int. Cl.
*H04L 9/40* (2022.01)
*G06F 11/362* (2025.01)

(52) U.S. Cl.
CPC ........ *H04L 63/1425* (2013.01); *G06F 11/366* (2013.01)

(58) Field of Classification Search
None
See application file for complete search history.

(56) References Cited

U.S. PATENT DOCUMENTS

| | | | |
|---|---|---|---|
| 12,361,123 B1 * | 7/2025 | Sanchez Rola | G06F 21/554 |
| 2015/0256556 A1 * | 9/2015 | Kaminsky | H04L 63/168 |
| | | | 726/23 |
| 2018/0373849 A1 * | 12/2018 | Gidley | G06F 21/6245 |
| 2020/0007342 A1 * | 1/2020 | Liem | H04L 9/0643 |
| 2021/0385245 A1 * | 12/2021 | Melson | H04L 63/1433 |

OTHER PUBLICATIONS

Musch et al., U Can't Debug This: Detecting JavaScript Anti-Debugging Techniques in the Wild, Aug. 11-13, 2021, USENIX, 17 total pages (Year: 2021).*

* cited by examiner

*Primary Examiner* — Christopher C Harris
(74) *Attorney, Agent, or Firm* — Lucem, PC; Heedong Chae (57) ABSTRACT

The present disclosure relates to a service providing system and method for security of data based on a web browser. In more detail, the present disclosure relates to a service providing system and method for security of data based on a web browser, the system and method preventing unauthorized takeover of data by accurately finding out whether development tools provided from a web browser for hacking data, which is transmitted through a web browser, are being driven, and the system and method securing security for data by using a one-off encoding/decoding module. According to the present disclosure, it is possible to accurately find out whether a developer tool is being driven through a web server and prevent execution of the developer tool by guiding a hacker to an error page, whereby it is possible to safely transmit data and increase security for data.

10 Claims, 4 Drawing Sheets

SERVICE PROVIDING SYSTEM AND METHOD FOR SECURITY OF DATA BASED ON WEB BROWSER

CROSS REFERENCE TO RELATED APPLICATION

The present application claims priority to Korean Patent Applications No. 10-2023-0165730, filed Nov. 24, 2023 the entire contents of which are incorporated herein for all purposes by this reference.

BACKGROUND

Technical Field

The present disclosure relates to a service providing system and method for security of data based on a web browser. In more detail, the present disclosure relates to a service providing system and method for security of data based on a web browser, the system and method preventing unauthorized takeover of data by accurately finding out whether development tools provided from a web browser for hacking data, which is transmitted through a web browser, are being driven, and the system and method securing security for data by using a one-off encoding/decoding module.

DESCRIPTION OF THE RELATED ART

A present, anyone can use developer tools in web browsers and it is possible to easily debug Javascript corresponding to a program through developer tools even though it is obfuscated, so it is not easy to safely transmit data in a web browser environment.

Accordingly, in current data transmission under a web browser environment, no matter how much it is encoded, it is possible to copy website data in large quantity by obtaining an encoded key through developer tools, which are provided in web browsers, finding out a decoding mechanism, and then automating the decoding mechanism into a program.

The current data security in data web browsers can be summarized into two types as follows.
1. A method of preventing execution of developer tools or sensing that a developer tool is being executed.
2. A method of safely transmitting a key that is used to decode encoded data.

In the method 1, existing security systems check whether developer tools are being executed through a method of examining the difference in driving time.

That is, a method of sensing the fact that the execution time of a program from a code segment A to a code segment B of the program is very short when a developer tool is not executed but the time may increase when a developer tool is executed and a breakpoint is set is used. Further, when many values are set to be output for logs of developer tools, the codes are not executed in an environment in which the developer tools are not executed, so time is disregarded, but when a developer tool is being executed, the output time is very long, so a difference is generated in program time. Whether developer tools are being executed is examined using this principle.

However, when time is made slowly go by by hooking a function that examines time in a web browser, the web browser cannot normally measure time, so it is possible to simply detour the method 1, whereby the method has a problem that it is vulnerable to hacking.

Further, according to the method 2, when a developer tool is executed, existing security systems can analyze not only a decoding key, but an encoding algorithm through a program, so it is not easy to effectively and safely transmit data. Further, most encoding/decoding types that are currently used in sites can be easily decoded using a Javascript encoding library such as CryptoJS when an algorithm and a key such as AES-128-CBC are known, so the types have a problem that they are more vulnerable to hacking through developer tools.

SUMMARY

An objective of the present disclosure is to increase security for data that is transmitted in web browser environments by increasing security for data by checking whether developer tools of a web browser are being driven and making a web server, which transmits data that needs to be secured to a web browser, examine whether the developer tools are being driven, and by giving support to be able to prevent exposure of an encoding/decoding module by creating and providing a one-off encoding/decoding module every time a program included in a web page is executed by means of a web browser.

A service providing method for security of data based on a web browser according to an embodiment of the present disclosure may include: a registering step of executing a security script of a web page received from a web server and transmitting identifier registration request information including a unique identifier created through the security script to the web server by means of a web browser of a user terminal; a start setting step of setting a reception point in time of the identifier registration request information when the identifier registration request information is received, as a start point in time for determining whether a developer tool provided from the web browser to debug the web page is being driven by means of the web server; a driving determining step of determining whether the developer tool is being driven through the security script, and transmitting script request information for requesting a decoding processing script related to decoding processing of data to the web server when the developer tool is not being used, by means of the web browser; an examining step of setting a reception point in time of the script request information as an end point in time for determining whether the developer tool is being driven when the script request information is received, and determining whether a time difference between the start point in time and the end point in time is less than a preset reference setting time by means of the web server; and a script providing step of transmitting an abnormal script for displaying an error page in the web browser to the web browser when the time difference is the preset reference setting time or more by means of the web server.

As an example related to the present disclosure, the service providing method may further include displaying an error page through the abnormal script when the abnormal script is received after the script providing step by means of the web browser.

As an example related to the present disclosure, in the driving determining step, the web browser may perform at least one determining step of: a first determining step of computing whether a time function for measuring execution consumption time of the developer tool has been hooked by applying a call-checking method for checking an object that called a function of a variable to the time function through the security script, and determining whether the developer tool is being driven in accordance with whether the time function has been hooked; a second determining step of calling a global variable list for the web page and determining whether the developer tool is being driven in accordance with whether a global variable that called the time function exists by applying the call-checking method to each of one or more global variables included in the global variable list; a third determining step of measuring execution consumption time of a specific program included in the web page through the security script, determining that the developer tool is not being driven when the execution consumption time is less than preset reference consumption time based on the execution consumption time, and determining that the developer tool is being driven when the execution consumption time is the preset reference consumption time or more; and a fourth determining step of checking a window size corresponding to the web page and determining whether the developer tool is being driven in accordance with whether the window size decreases less than a preset size through the security script, and the service providing method may further include displaying an error page through the security script when the developer tool is being driven as the result of performing.

As an example related to the present disclosure, the script providing step may further include creating a key encoding module and a key decoding module that correspond to the unique identifier when the time difference is less than the preset reference setting time, and creating the decoding processing script corresponding to the unique identifier to the web browser by means of the web server.

As an example related to the present disclosure, the key encoding module and the key decoding module each may be a one-off module.

As an example related to the present disclosure, the script providing step may randomly select any one of a plurality of preset different encoding algorithms and create the key encoding module and the key decoding module that correspond to the unique identifier based on the selected encoding algorithm by means of the web server.

As an example related to the present disclosure, the service providing method may further include, after the script providing step: a data request step of transmitting data request information for requesting encoded information to the web server through the decoding processing script by means of the web browser; an encoded information transmitting step of transmitting encoded information encoded with a random key to the web browser when receiving the data request information by means of the web server; a key request step of transmitting key request information for requesting an encoding key from the web server through the decoding processing script when receiving the encoded information by means of the web browser; a key transmitting step of transmitting an encoded key obtained by encoding the random key through the key encoding module to the web browser when receiving the key request information by means of the web server; a module request step of transmitting module request information for requesting the key decoding module to the web server through the decoding processing script when receiving the encoded key by means of the web browser; module transmitting step of transmitting a key decoding module corresponding to the module request information to the web browser when receiving the module request information by means of the web server; and a decoding step of decoding the encoded key through the key decoding module and decoding the encoded information with the decoded random key.

As an example related to the present disclosure, the script providing step may further include setting another start point in time for determining whether the developer tool is being driven based on a transmission point in time of the decoding processing script by means of the web server; the data request step may further include determining whether the developer tool is being driven through the decoding processing script and transmitting the data request information when the developer tool is not being used, by means of the web browser; and the module transmitting step may further include setting another end point in time based on a reception point in time of the module request information, and transmitting the key decoding module to the web browser when a time difference between the another start point in time and the another end point in time is less than the preset reference setting time by means of the web server.

As an example related to the present disclosure, in the data request step, the web browser may perform at least one determining step of: a fifth determining step of computing whether the time function has been hooked by applying a call-checking method for checking an object that called a function of a variable to the time function through the decoding processing script, and determining whether the developer tool is being driven in accordance with whether the time function has been hooked; a sixth determining step of calling a global variable list for the web page through the decoding processing script and determining whether the developer tool is being driven in accordance with whether a global variable that called the time function exists by applying the call-checking method to each of one or more global variables included in the seventh determining step of global variable list; a calculating execution consumption time of another program included in the web page through the decoding processing script, determining that the developer tool is not being driven when the execution consumption time of the another program is less than preset reference consumption time, and determining that the developer tool is being driven when the execution consumption time of the another program is the preset reference consumption time or more; and an eighth determining step of checking a window size corresponding to the web page and determining whether the developer tool is being driven in accordance with whether the window size decreases less than a preset size through the decoding processing script, and the service providing method may further include displaying an error page through the decoding processing script when the developer tool is being driven as the result of performing.

A service providing system for security of data based on a web browser according to an embodiment of the present disclosure includes: a web server; and a web browser configured in a user terminal configured to communicate with the web server, wherein the web browser executes a security script of a web page received from a web server and transmits identifier registration request information including a unique identifier created through the security script to the web server; the web server sets a reception point in time of the identifier registration request information when the identifier registration request information is received, as a start point in time for determining whether a developer tool provided from the web browser to debug the web page is being driven; the web browser determines whether the developer tool is being driven through the security script, and transmits script request information for requesting a decoding processing script related to decoding processing of data to the web server when the developer tool is not being used; and the web server sets a reception point in time of the script request information as an end point in time for determining whether the developer tool is being driven when the script request information is received, determines whether a time difference between the start point in time and the end point in time is less than a preset reference setting time, and transmits an abnormal script for displaying an error page in the web browser to the web browser when the time difference is the preset reference setting time or more.

As described above, according to the present disclosure, in order to prevent unauthorized takeover of data, which needs to be secured in a web page, by hooking a script operating to process the data using a developer tool provided to debug the web page from the web browser, whether a developer tools is being driven is monitored through scripts included in a web page and the web server also separately examines whether a developer tool is being driven by measuring execution consumption time of a program provided in the web page on the basis of information transmitted from the web browser in accordance with execution of the script. Accordingly, even though a function for examining whether a developer tool of a script is being used is hooked, it is possible to give support to be able to accurately find out whether the developer tool is being driven through the web server and it is possible to prevent execution of the developer tool by guiding a hacker to an error page when the developer tool is being driven. Therefore, it is possible to safely transmit data and increase security for data.

Further, according to the present disclosure, the web server creates a one-off encoding/decoding module every time a program, which is provided through a web page to open data that needs to be secured in the web browser, is executed, and encodes a key for data encoding on the basis of the encoding/decoding module and then provides the key to the web browser, and provides a decoding module for decoding a key for decoding encoded data only when developer tools are not driven. Accordingly, it is possible to prevent exposure of an encoding/decoding module by changing and providing the encoding/decoding module into a one-off module every time a program is executed and it is possible to easily maintain security using another encoding/decoding module in the next data processing even though the encoding/decoding module is exposed. Therefore, it is possible to increase security for data that is provided on the basis of a web.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

Hereinafter, detailed embodiments of the present disclosure are described with reference to the drawings.

Figure 1:
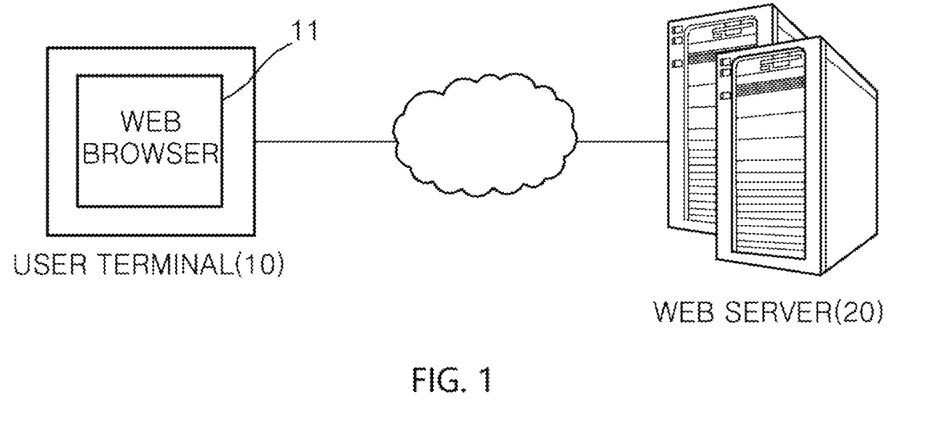
FIG. 1 is a configuration diagram of a service providing system for security data based on a web browser according to an embodiment of the present disclosure.

FIG. 1 is a configuration diagram of a service providing system for security of data based on a web browser (hereafter, service providing system) according to an embodiment of the present disclosure.

As shown in the figure, a service providing system according to an embodiment of the present disclosure may include a web browser 11 configured in a user terminal 10 and a web server 20 communicating with the web browser 11 of the user terminal 10 through a communication network.

In this configuration, the communication network described in the present disclosure may include wired/wireless communication networks, and the wireless communication network may include Wireless LAN (WLAN), Digital Living Network Alliance (DLNA), Wireless Broadband (Wibro), World Interoperability for Microwave Access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), a 5G mobile communication service, Bluetooth, Long Range (LoRa), Radio Frequency Identification (RFID), Infrared Data Association (IrDA), Ultra Wideband (UWB), ZigBee, Near Field Communication (NFC), Ultra Sound Communication (USC), Visible Light Communication (VLC), Wi-Fi, Wi-Fi Direct, etc. Further, the wired communication network may include a Local Area Network (LAN), a wired Wide Area Network (WAN), Power Line Communication (PLC), USB communication, Ethernet, serial communication, an optical/coaxial cable, etc.

Further, the user terminal 10 described in the present disclosure may include various terminals such as a smart phone, a portable terminal, a mobile terminal a Personal Digital Assistant (PDA), a personal computer, a notebook computer, a slate PC, a tablet PC, and an ultrabook that have a communication function.

Further, the user terminal 10 may include a terminal communication unit for communication with the web server 20, a terminal storage unit that stores various items of information, a user input unit that receives input by a user, a terminal display unit that displays various items of information, a terminal control unit that performs a function of generally controlling the user terminal 10, etc.

In this configuration, the terminal storage unit may include execution data relating to the web browser 11 and the terminal control unit can operate as the web browser 11 by executing the execution data.

Further, the terminal controller may include a RAM, a ROM, a CPU, a GPU, and buses, the RAM, ROM, CPU, GPU, etc. can be connected to each other through the buses, and the terminal communication unit and the terminal storage unit may be included in the terminal control unit.

Further, the web browser 11 described in the present disclosure may mean a terminal control unit when the web browser 11 is in execution, and in this case, the terminal control unit may be configured as the web browser 11.

Further, the web browser 11 can communicate with the web server 20 by connecting with the web server 20 through the communication unit and a communication configuration through the communication unit is omitted hereafter.

Further, the web server 20 may include a communication unit that communicates with the user terminal 10 or the web browser 11 of the user terminal 10, a storage unit that stores various items of information, a control unit that performs a function of generally controlling the web server 20, etc.

In this configuration, service-related data that is provided from the web server 20 may be stored in the storage unit, and for example, data such as one or more web pages constituting a web site relating to the service, various contents constituting the web pages, and various algorithms may be stored in the storage unit.

Further, data relating to various modules or scripts for safely transmitting data that needs to be secured and constitutes the service to the user terminal 10 may be stored in the storage unit.

Further, the storage unit may be configured as a DB or may include one or more DBs and the storage unit may be configured as a separate database server.

Further, the control unit may perform a function of generally controlling the web server 20 and may include a RAM, a ROM, a CPU, a GPU, and buses, and the RAM, the ROM, the CPU, the GPU, etc. may be connected to each other through the buses.

The operation configuration of the web server 20 to be described below may be performed by the control unit of the web server 20 and the control unit can communicate with the user terminal 10 or the web browser 11 of the user terminal 10 through the communication unit.

In order to prevent the case in which a user who has no authority to use security data that needs to be secured, such as contents that require authority and are provided through scripts of a web page provided from the web server 20, opens the security data by hooking or hacking the scripts through developer tools of the web browser 11 on the web browser 11 of the user terminal 10 connecting to the web server 2 to use services of the web server 20, the service providing system according to an embodiment of the present disclosure can give support so that the security data can be safely transmitted by blocking access to the security data by checking whether the developer tools are operated and transmitting abnormal data when a developer tool is operated, on the basis of the configuration described above, which is described in detail with reference to the drawings.

Figure 2:
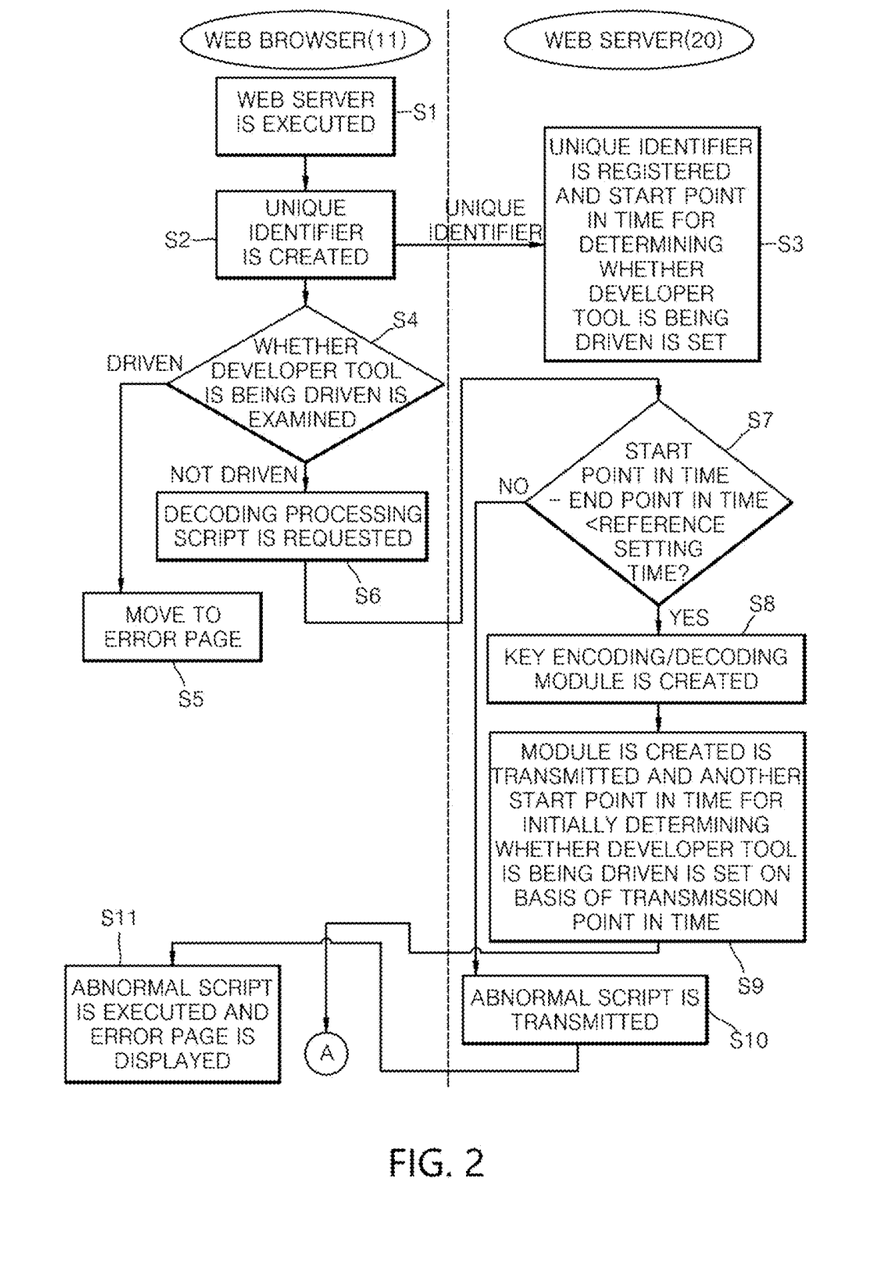
FIG. 2 and FIG. 3 are flowcharts showing a service providing method for security of data based on a web browser of a service providing system according to an embodiment of the present disclosure.
Figure 3:
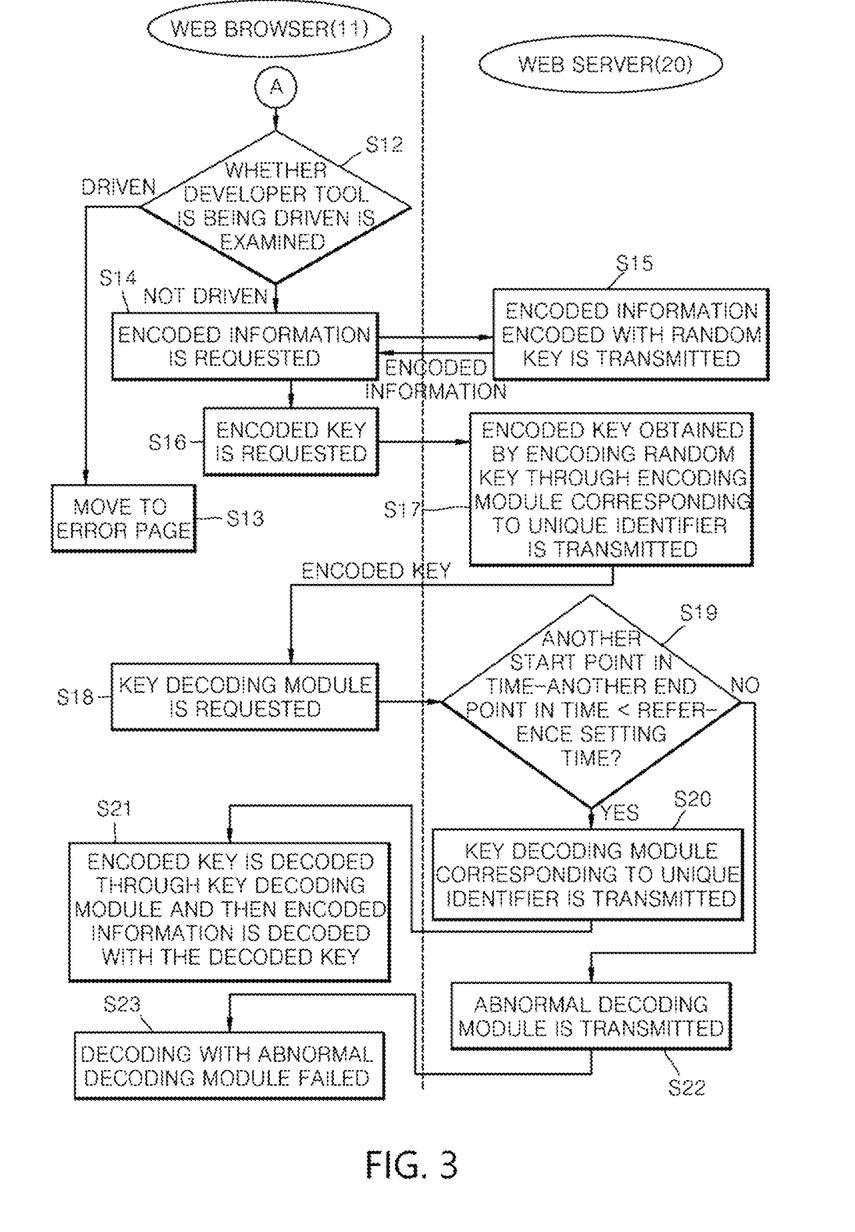

FIG. 2 and FIG. 3 are flowcharts showing a service providing method for security of data based on a web browser 11 of a service providing system according to an embodiment of the present disclosure.

As shown in the figures,

Further, the web browser 11 can execute the security script included in the web page while loading the web page (S1).

Further, the web browser 11 can create a unique identifier corresponding to the user terminal 10 through the security script and can create and transmit identifier registration request information including the unique identifier for temporarily registering the unique identifier on the web server 20 through the security script (S2).

In this case, the security script may be configured in the form of Javascript and can create a unique identifier based on universally unique identifier (UUID).

Further, the unique identifier may be used as an identifier for session identification between the web server 20 and the web browser 11.

Further, the identifier registration request information may include terminal identification information corresponding to the user terminal 10, and in this case, the terminal identification information may be an internet protocol (IP) corresponding to the user terminal 10.

Further, when receiving the identifier registration request information, the web server 20 can temporarily store and register the unique identifier included in the identifier registration request information in the storage unit included in the web server 20 or can match and temporarily store and register the unique identifier and the terminal identification information in the storage unit on the basis of the identifier registration request information, and can set a reception point in time of the identifier registration request information as a start point in time for determining whether the developer tools provided by the web browser 11 are being driven in order to edit and debug the web page (S3).

In this case, the web server 20 can identify the web browser 11 of the user terminal 10 on the basis of the unique identifier or the terminal identification information matched to the unique identifier.

Further, the developer tools described in the present disclosure, which are tools set in advance in the web browser 11 and provided to be able to analyze the structure, style, operation, etc. of a web page and debug the web page, are provided by various web browsers 11 such as Chrome, Firefox, and Edge.

Further, the web server 20 can match the start point in time to the unique identifier and temporarily store it in the storage unit.

Further, the web browser 11 can determine whether the developer tools are being driven through the security script (S4).

In this case, an embodiment about determining whether the developer tools of the web browser 11 are being driven is described with reference to FIG. 4.

In general, whether a developer tool is being driven is determined in the related art by measuring an execution consumption time of a specific program through a time function (or a time-related system function) for measuring the execution consumption time of developer tools such as Date.now( ) or performance.now( ). However, when a hacker calls a time function by driving a developer tool and redefines a time function such as changing the time measurement method of a time function using a corresponding developer tool, it is possible to incapacitate the time function such that it is determined that a developer tool is not being driven even though the developer tool is being driven.

In this case, the time function may be included in the security script.

Accordingly, the web browser 11 can check the target that called the time function by applying a call-checking method for checking an object (e.g., a variable or a function) that called a function or a variable to the time function through the security script to determine whether the developer tools are being driven, and can determine whether the time function has been hooked.

It is possible to use a toString( ) method as the call-checking method. The web browser 11 can determine that the time function has been hooked when the result of applying and executing the call-checking method to the time function is not output as a preset normal value such as 'function now( ) {[native code]}' and a call matter including the variable that called the time function is output by applying the call-checking method to the time function as 'time function name.toString( )' such as 'performance.now.toString( )' through the security script.

In this case, the web browser 11 may determine that the time function has been hooked when the variable or function that called the time function is not a pre-registered variable or function in the result of applying and executing the call-checking method to the time function through the security script.

Accordingly, the web browser 11 can determine whether the time function has been hooked on the basis of the result of applying the call-checking method to the time function through the security script, and can determine that the developer tool is being driven when the time function has been hooked as the result of determination (S41 and S42).

However, it is difficult to prevent all of hooking types because a time function may be hooked in various types other than redefining a time function described above, but it is required to eventually call a time function once even though there is fabrication that a time function has not been hooked. Accordingly, for this problem, it is possible to determine whether a developer tool is being driven by checking the case in which a hacker drives a developer tool and sets the time function of a security script as a global variable using the developer tool.

To this end, the web browser 11 can call (create) a global variable list for the web page or the security script before starting a specific program included in the web page through the security scrip, and can determine whether the developer tool is being driven in accordance with whether a global variable that called a time function exists, by applying the call-checking method to each of one or more global variables included in the global variable list.

For example, when a call of a time function is found such as 'var hackedData=Data.now( )' as the result of applying the call-checking method to any one of the one or more global variables, the web browser 11 can determine that there was an attempt to hook the time function through setting of the global variable of the time function and can determine that the developer tool is being driven.

Accordingly, when a global variable that called a time function exists as the result of applying the call-checking method to each of one or more global variables included in the global variable list, the web browser 11 can determine that the developer tool is being driven (S43 and S44).

In this case, the web browser 11 can determine that the time function has been hooked and the developer tool is being driven when the global variable that called the time function is not a pre-registered variable in the result of applying and executing the method for checking a call to the global variable through the security script.

Further, other than the methods described above, the web browser 11 may measure an execution consumption time of a program included in the web page through the security script and determine whether the developer tool is being driven on the basis of the measured execution consumption time (S45 and S46).

In this case, the web browser 11 can check the execution consumption time through the time function included in the security script.

For example, the web browser 11 can calculate the execution consumption time of a specific program from a code segment A to B code segment included in the web page through the security script, and can determine that the developer tool is not being driven when the execution consumption time is less than a reference consumption time set in advance in the security script.

In this case, the web browser 11 checks the window size corresponding to the web page through the security script, and can determine that the developer tool is being driven when the window size decreases less than a preset size (S47 and S48).

That is, the web browser 11 can determine as described above by using the fact that the window size decreases when a developer tool is activated.

As described above, when determining that the developer tool is not being driven in the user terminal 10 through the security script, the web browser 11 can create and transmit script request information for requesting a decoding processing script related to decoding of data to the web server 20 (S6).

Alternatively, the web browser 11 can determine that the developer tool is being driven through the security script when the execution consumption time of the program is a preset reference consumption time or more.

Accordingly, when determining that the developer tool is being driven, the web browser 11 can display a preset error page on the user terminal 10 through the security script (S5).

In this case, when determining that the developer tool is being driven, the web browser 11 can connect to an error page that is a preset web page through the security script, and can receive the error page from the web server 20 and the display the error page.

Further, when receiving the script request information from the web browser 11, the web server 20 can set the reception point in time of the script request information as an end point in time for determining whether the developer tool is being driven.

Further, the web server 20 can match the end point in time to the unique identifier according to the script request information and temporarily store it in the storage unit.

In this case, the web server 20 can determine that the start point in time as an execution start point in time of the specific program for determining whether the developer tool is being driven, and can determine the end point in time as an execution completion point in time of the specific program.

Further, the web server 20 can calculate the time difference between the start point in time and the end point in time that were matched with the unique identifier, and can determine whether the time difference is less than a preset reference time (or a reference setting time) (S7).

Further, when the time difference is the preset reference time (reference setting time) or more, the web server 20 can determine that the developer tool is operating in the web browser 11 and can transmit an abnormal script for displaying an error page in the web browser 11 to the web browser 11 (S10).

Accordingly, when receiving the abnormal script from the web server 20, the web browser 11 can display an error page through the display unit of the user terminal 10 in accordance with execution of the abnormal script (S11).

In this case, the web browser 11 may connect to the error page and display the error page in accordance with execution of the abnormal script.

Further, when the time difference is less than the preset reference time (reference setting time), the web server 20 can determine that the developer tool is not being driven in the web browser 11 and can create a key encoding module and a key decoding module that correspond to the unique identifier according to the script request information (S8).

In this case, the web server 20 can randomly select any one of a plurality of preset different encoding algorithms (or encoding/decoding algorithms) and create the key encoding module and the key decoding module that correspond to the unique identifier on the basis of the selected encoding algorithm.

Further, the web server 20 can transmit a decoding processing script corresponding to the unique identifier to the web browser 11 corresponding to the unique identifier according to the script request information (S9).

In this case, the web browser 20 can create the decoding processing script on the basis of at least one of the key encoding module and the key decoding module or can extract and provide a decoding processing script stored in advance to the storage unit to the web browser 11.

Further, the web server 20 can match the decoding processing script to the unique identifier and store it in the storage unit.

Further, the web browser 20 can match another start point in time for determining whether the developer tool is being driven to the unique identifier and set the another start point on the basis of the transmission point in time of the decoding processing script, and can match the another start point in time to the unique identifier and store it in the storage unit (S9).

Further, the web browser can create the key encoding module and the key decoding module as one-off modules, and can match the key encoding module and the key decoding module to the unique identifier and store them in the storage unit.

Meanwhile, when receiving the decoding processing script from the web server 20, the web browser 11 can execute the decoding processing script.

Further, the web browser 11 can transmit data request information for requesting decoded information to the web server 20 through the decoding processing script.

The web browser 11 can determine whether the developer tool is being driven through the decoding processing script before transmitting the data request information, and can transmit the data request information when the developer tool is not being driven (S14).

Figure 4:
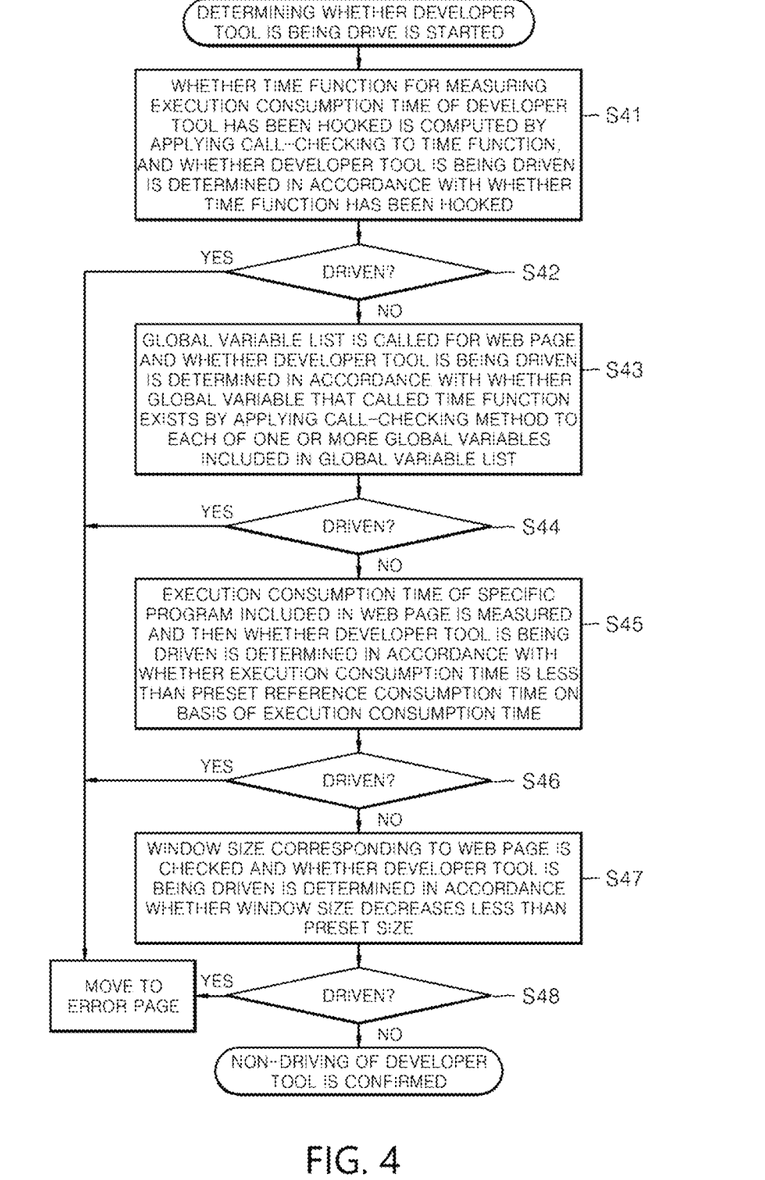
FIG. 4 is a flowchart showing operation of determining whether a developer tool is being driven by a service providing system according to an embodiment of the present disclosure.

In this case, the method of determining whether the developer tool is being driven through the decoding processing script by means of the web browser 11 may be the same as the method of determining whether developer tool is being driven through the security script shown in FIG. 4 (S41 to S48).

For example, the web browser 11 can determine whether the time function has been hooked by applying a call-checking method to the time function through the decoding processing script and can determine that the developer tool is being driven when the time function has been hooked.

Further, the web browser 11 can call (create) a global variable list for the web page or the decoding processing script through the decoding processing script before executing another according program to the decoding processing script that will be described below, and can determine that the developer tool is being driven when a global variable that called a time function exists in accordance with the result of applying the call-checking method to each of one or more global variables included in the global variable list.

Further, the web browser 11 can execute another included in the web page in accordance with the program decoding processing script and can check execution consumption time according to execution of the another program.

In this case, the web browser 11 can check the execution consumption time through the time function included in the decoding processing script.

Further, when the execution consumption time corresponding to the another program is a preset reference consumption time or more, the web browser 11 can determine that the developer tool is being driven, and when the execution consumption time corresponding to the another program is less than the preset reference consumption time, the web browser 11 can determine that developer tool is not being driven.

In this case, the web browser 11 checks the window size corresponding to the web page through the decoding processing script, and can determine that the developer tool is being driven when the window size decreases less than a preset size.

Further, when the developer tool is being driven as the result of determining whether the developer tool is being driven through the decoding processing script, the web browser 11 can connect to a preset error page according to the decoding processing script and can display the error page (S13).

Meanwhile, when receiving the data request information from the web browser 11, the web server 20 can transmit encoded information encoded with a random key to the web browser 11 (S15).

In this case, the encoded information may be encoded information obtained by encoding contents provided from the web server 20 with the random key.

Further, the web server 20 can match the random key to the unique identifier and temporarily store i in the storage unit.

Further, when receiving the encoded information from the web server 20, the web browser 11 can transmit key request information for requesting an encoded key from the web server 20 through the decoding processing script (S16).

In this case, the key request information may include the unique identifier or a script ID set in the decoding processing script.

Accordingly, when receiving the key request information, the web server 20 can extract a key encoding module corresponding to the key request information from the storage unit, extract a random key corresponding to the key request information from the storage unit, and create and transmit an encoded key obtained by encoding the random key through the extracted key encoding module to the web browser 11 (S17).

For example, the web browser 20 extracts a key encoding module matched with a unique identifier according to the key request information from the storage unit, extracts a random key matched with the unique identifier according to the key request information, and then encodes the extracted random key through the extracted key encoding module, thereby being able to create an encoded key.

Further, when receiving the encoded key, the web browser 11 can create and transmit module request information for requesting the key decoding module to the web server 20 through the decoding processing script (S18).

Accordingly, when receiving the module request information from the web browser 11 of the user terminal 10, the web server 20 can match another end point in time to the unique identifier and set the another end point in time on the basis of the reception point in time of the module request information.

In this case, the module request information may include an unique identifier, and the web server 20 can set the reception point in time of the module request information as the another end point in time, and can match the another end point in time with the unique identifier according to the module request information and store the another end point in time in the storage unit.

Further, the web server 20 can determine whether a developer tool is being driven in the web browser in accordance with whether the time difference between the another start point in time and the another end point in time is less s than the preset reference time (reference setting time) (S19).

Accordingly, when the time difference between the another start point in time and the another end point in time is less than the preset reference time (reference setting time), the web server 20 can determine that the developer tool is not being driven and can transmit the key decoding module matched to the unique identifier to the web browser 11 (S20).

In this case, the web server 20 can extract a key decoding module matched to a unique identifier according to the module request information from the storage unit and transmit the key decoding module to the web browser 11.

Further, when the time difference between the another start point in time and the another end point in time is the preset reference time (reference setting time) or more, the web server 20 can determine that the developer tool is being driven in the user terminal 10.

Accordingly, when the developer tool is being driven in the web browser 11 of the user terminal 10, the web server 20 can transmit an error page stored in advance to the storage unit to the web browser 11 or transmit an abnormal decoding module to the web browser 11 (S22).

In this case, the web browser 11 receiving the error page or the abnormal decoding module can operate such that the error page is displayed or the encoded key cannot be decoded through the abnormal decoding module (S23).

Meanwhile, when receiving the key decoding module from the web server 20, the web browser 11 can obtain the random key by decoding the encoded key on the basis of the key decoding module.

Further, the web browser 11 can decode the encoded information with the obtained random key and provide (display) the decoded information (S21).

Further, when session disconnection with the web browser 11 is ended, the web server 20 can delete the unique identifier and all of the information matched with the unique identifier and then stored from the storage unit.

As described above, according to the present disclosure, in order to prevent unauthorized takeover of data, which needs to be secured in a web page, by hooking a script operating to process the data using a developer tool provided to debug the web page from the web browser 11, whether a developer tools is being driven is monitored through scripts included in a web page and the web server 20 also separately examines whether a developer tool is being driven by measuring execution consumption time of a program provided in the web page on the basis of information transmitted from the web browser 11 in accordance with execution of the script. Accordingly, even though a function for examining whether a developer tool of a script is being used is hooked, it is possible to give support to be able to accurately find out whether the developer tool is being driven through the web server 20 and it is possible to prevent execution of the developer tool by guiding a hacker to an error page when the developer tool is being driven. Therefore, it is possible to safely transmit data and increase security for data.

Further, according to the present disclosure, the web server 20 creates a one-off encoding/decoding module every time a program, which is provided through a web page to open data that needs to be secured in the web browser 11, is executed, and encodes a key for data encoding on the basis of the encoding/decoding module and then provides the key to the web browser 11, and provides a decoding module for decoding a key for decoding encoded data only when developer tools are not driven. Accordingly, it is possible to prevent exposure of an encoding/decoding module by changing and providing the encoding/decoding module into a one-off module every time a program is executed and it is possible to easily maintain security using another encoding/decoding module in the next data processing even though the encoding/decoding module is exposed. Therefore, it is possible to increase security for data that is provided on the basis of a web.

The components described in the embodiments of the present disclosure may be achieved by one or more common computers or computers for specific purposes, such as a storage; hardware such as a processor, a controller, an ALU (arithmetic logic unit), a digital signal processor, a microcomputer, an FPGA (Field Programmable Gate Array), a PLU (programmable logic unit), and a microprocessor; and any devices that can execute software including a set of instructions and a combination thereof or instructions and can give responses.

Various devices and components described herein may be achieved by a hardware circuit (e.g., a CMOS-based logic circuit), firmware, software, or a combination thereof. For example, they may be achieved by using transistors, logic gates, and electronic circuits in various electrical structures.

The above description may be changed and modified by those skilled in the art without departing from the fundamental characteristics of the present disclosure. Accordingly, the embodiments described herein are provided merely not to limit, but to explain the spirit of the present disclosure, and the spirit of the present disclosure is not limited by the embodiments. The protective range of the present disclosure should be construed by the following claims and the scope and spirit of the present disclosure should be construed as being included in the range of right of the present disclosure.

DESCRIPTION OF REFERENCE NUMERALS

10: USER TERMINAL
11: WEB BROWSER
20: WEB SERVER

What is claimed is:

1. A service providing method for security of data based on a web browser, the service providing method comprising:
   a registering step of executing a security script of a web page received from a web server and transmitting identifier registration request information n including a unique identifier created through the security script to the web server by means of a web browser of a user terminal;
   a start setting step of setting a reception point in time the identifier registration request information when the identifier registration request information is received, as a start point in time for determining whether a developer tool provided from the web browser to debug the web page is being driven by means of the web server;
   a driving determining step of determining whether the developer tool is being driven through the security script, and transmitting script request information for requesting a decoding processing script related to decoding processing of data to the web server when the developer tool is not being used, by means of the web browser;
   an examining step of setting a reception point in time of the script request information as an end point in time for determining whether the developer tool is being driven when the script request information is received, and determining whether a time difference between the start point in time and the end point in time is less than a preset reference setting time by means of the web server; and a script providing step of transmitting an abnormal script for displaying an error page in the web browser to the web browser when the time difference is the preset reference setting time or more by means of the web server.

2. The service providing method of claim 1, further comprising displaying an error page through the abnormal script when the abnormal script is received after the script providing step by means of the web browser.

3. The service providing method of claim 1, wherein, in the driving determining step, the web browser performs at least one determining step of:

a first determining step of computing whether a time function for measuring execution consumption time of the developer tool has been hooked by applying a call-checking method for checking an object that called a function of a variable to the time function through the security script, and determining whether the developer tool is being driven in accordance with whether the time function has been hooked;

a second determining step of calling a global variable list for the web page and determining whether the developer tool is being driven in accordance with whether a global variable that called the time function exists by applying the call-checking method to each of one or more global variables included in the global variable list;

a third determining step measuring execution consumption time of a specific program included in the web page through the security script, determining that the developer tool is not being driven when the execution consumption time is less than preset reference consumption time based on the execution consumption time, and determining that the developer tool is being driven when the execution consumption time is the preset reference consumption time or more; and a fourth determining step of checking a window size corresponding to the web page and determining whether the developer tool is being driven in accordance with whether the window size decreases less than a preset size through the security script, and the service providing method further includes displaying an error page through the security script when the developer tool is being driven as the result of performing.

4. The service providing method of claim 1, wherein the script providing step further includes creating a key encoding module and a key decoding module that correspond to the unique identifier when the time difference is less than the preset reference setting time, and creating the decoding processing script corresponding to the unique identifier to the web browser by means of the web server.

5. The service providing method of claim 4, wherein the key encoding module and the key decoding module are each a one-off module.

6. The service providing method of claim 4, wherein the script providing step randomly selects any one of a plurality of preset different encoding algorithms and creates the key encoding module and the key decoding module that correspond to the unique identifier based on the selected encoding algorithm by means of the web server.

7. The service providing method of claim 4, further comprising, after the script providing step;

a data request step of transmitting data request information for requesting encoded information to the web server through the decoding processing script by means of the web browser;

an encoded information transmitting step of transmitting encoded information encoded with a random key to the web browser when receiving the data request information by means of the web server;

a key request step of transmitting key request information for requesting an encoding key from the web server through the decoding processing script when receiving the encoded information by means of the web browser;

a key transmitting step of transmitting an encoded key obtained by encoding the random key through the key encoding module to the web browser when receiving the key request information by means of the web server;

a module request step of transmitting module request information for requesting the key decoding module to the web server through the decoding processing script when receiving the encoded key by means of the web browser;

module transmitting step of transmitting a key decoding module corresponding to the module request information to the web browser when receiving the module request information by means of the web server; and a decoding step of decoding the encoded key through the key decoding module and decoding the encoded information with the decoded random key.

8. The service providing method of claim 7, wherein the script providing step further includes setting another start point in time for determining whether the developer tool is being driven based on a transmission point in time of the decoding processing script by means of the web server;

the data request step further includes determining whether the developer tool is being driven through the decoding processing script and transmitting the data request information when the developer tool is not being used, by means of the web browser; and the module transmitting step further includes setting another end point in time based on a reception point in time of the module request information, and transmitting the key decoding module to the web browser when a time difference between the another start point in time and the another end point in time is less than the preset reference setting time by means of the web server.

9. The service providing method of claim 8, wherein, in the data request step, the web browser performs at least one determining step of:

a fifth determining step of computing whether the time function has been hooked by applying a call-checking method for checking an object that called a function of a variable to the time function through the decoding processing script, and determining whether the developer tool is being driven in accordance with whether the time function has been hooked;

a sixth determining step of calling a global variable list for the web page through the decoding processing script and determining whether the developer tool is being driven in accordance with whether a global variable that called the time function exists by applying the call-checking method to each of one or more global variables included in the global variable list;

a seventh determining step of calculating execution consumption time of another program included in the web page through the decoding processing script, determining that the developer tool is not being driven when the execution consumption time of the another program is less than preset reference consumption time, and determining that the developer tool is being driven when the execution consumption time of the another program is the preset reference consumption time or more; and an eighth determining step of checking a window size corresponding to the web page and determining whether the developer tool is being driven in accordance with whether the window size decreases less than a preset size through the decoding processing script, and the service providing method further includes displaying an error page through the decoding processing script when the developer tool is being driven as the result of performing.

10. A service providing system for security of data based on a web browser, the service providing system comprising:

a web server; and a web browser configured in a user terminal configured to communicate with the web server, wherein the web browser executes a security script of a web page received from a web server and transmits identifier registration request information including a unique identifier created through the security script to the web server;

the web server sets a reception point in time of the identifier registration request when information the identifier registration request information is received, as a start point in time for determining whether a developer tool provided from the web browser to debug the web page is being driven;

the web browser determines whether the developer tool is being driven through the security script, and transmits script request information for requesting a decoding processing script related to decoding processing of data to the web server when the developer tool is not being used; and the web server sets a reception point in time of the script request information as an end point in time for determining whether the developer tool is being driven when the script request information is received, determines whether a time difference between the start point in time and the end point in time is less than a preset reference setting time, and transmits s an abnormal script for displaying an error page in the web browser to the web browser when the time difference is the preset reference setting time or more.

\* \* \* \* \*